G. B. HALSTED.

Tea Pot.

No. 2,585. Reissued April 30. 1867.

Witnesses

Thos. F. McNamara

M. U. Lynch

Inventor,

G. B. Halsted

N. PETERS. Photo-Lithographer, Washington, D. C.

BEST AVAILABLE COPY

United States Patent Office.

G. B. HALSTED, OF NEW YORK, N. Y.

*Letters Patent No.* 48,061, *dated June* 6, 1865; *reissue No.* 2,585, *dated April* 30, 1867.

HANDLE FOR TEA AND COFFEE-POTS.

The Schedule referred to in these Letters Patent and making part of the same.

TO ALL WHOM IT MAY CONCERN:

Be it known that I, G. B. HALSTED, of the city, county, and State of New York, have invented a new and useful improvement in Handles for Metal Tea and Coffee-Pots; and I do hereby declare that the following is a full, clear, and exact description thereof, which will enable others skilled in the art to make and use the same, reference being had to the accompanying drawings, forming part of this specification, in which—

Figure 1:
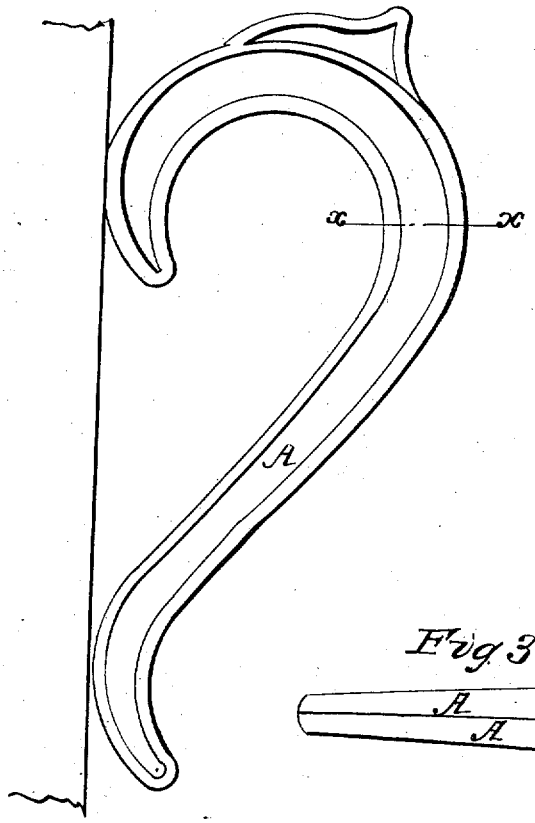

Figure 1 is a side view of my invention.

Figure 2:
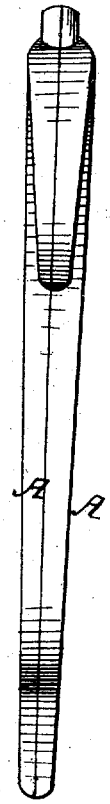

Figure 2, an edge view of the same.

Figure 3:
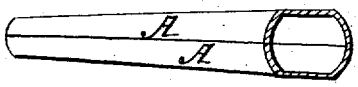

Figure 3, a transverse section of the same, taken in the line *x x*, fig. 1.

Figure 4:
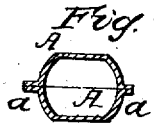

Figure 4, a transverse section of the same, in an unfinished state.

Similar letters of reference indicate corresponding parts.

The object of this invention is to obtain a sheet-metal handle for metal tea and coffee-pots, which may be cheaply constructed, and have a neat and ornamental appearance, far more so than the common white-metal and cast-iron handles hitherto used. The superior class of metal tea and coffee-pots are now provided with japanned cast-iron handles, and also with white-metal handles. These, however, receive and retain the heat from the warm contents of the vessel, and are heavy and expensive, so much so as to augment very materially the cost of such articles. My invention consists in having the handles constructed of two longitudinal parts, swaged or struck up in proper form, out of tinned plate, and connected together by solder or otherwise, so as to form a thin hollow or tubular handle, substantially as hereinafter set forth.

A A represent the two parts of the handle, which are swaged or struck up by means of proper dies of the form or shape desired, and out of tinned plate, The two parts A A are swaged by reverse dies, so that when joined or abutted together, a hollow or tubular handle will be formed, as shown clearly in fig. 3. After the parts are swaged or struck up, the burr *a*, fig. 4, is trimmed off, and the parts connected together by solder or otherwise. The handle, when finished, is also connected to the vessel by solder or otherwise. The part A may be swaged or struck up, so as to have a smooth exterior, or have any ornamental configuration or design upon it. Besides the economy attending this mode of construction, the handle possesses the advantage of being retained in a cool state, as it is tubular, and contains but little metal, and hence will not receive and retain in a material degree the heat from the warm contents of the vessel to which it is attached.

Having thus described my invention, I claim as new, and desire to secure by Letters Patent, as a new article of manufacture—

A handle for metal tea and coffee-pots, constructed of two longitudinal parts swaged or struck up in any desired form out of tinned plate, and connected together by solder or otherwise, substantially as herein set forth.

G. B. HALSTED.

Witnesses:

WM. F. MCNAMARA,

ALEX. F. ROBERTS.